United States Patent [19]
Knoll

[11] 3,827,427
[45] Aug. 6, 1974

[54] APPARATUS FOR MEASURING RADIOACTIVITY IN THE HUMAN EYE

[75] Inventor: Glenn F. Knoll, Ann Arbor, Mich.

[73] Assignee: The United States of America as represented by the United States Atomic Energy Commission, Washington, D.C.

[22] Filed: Jan. 8, 1973

[21] Appl. No.: 321,595

[52] U.S. Cl.................. 128/2 A, 128/2 T, 250/303
[51] Int. Cl.............................................. A61b 6/00
[58] Field of Search....... 128/2 A, 2 V, 2 T, 2.05 V; 250/363, 366, 369, 368, 303

[56] References Cited
UNITED STATES PATENTS
| | | | |
|---|---|---|---|
| 3,371,660 | 3/1968 | Carlin................................ | 128/2 T |
| 3,452,197 | 6/1969 | Saylor, Jr. et al.................. | 250/369 |
| 3,690,158 | 9/1972 | Lichtenstein et al............. | 128/2 V X |

OTHER PUBLICATIONS

Morris A. C., et al., Phys. Med. Biol., 1971, Vol. 16, No. 3, pp. 397-404.

Moody, N. F., et al., Proceedings of I.E.E.E., Feb., 1970, pp. 217-242.

*Primary Examiner*—Kyle L. Howell
*Attorney, Agent, or Firm*—John A. Horan; Arthur A. Churm; Donald P. Reynolds

[57] ABSTRACT

Measurement of radioactivity in the human eye is facilitated by affixing an eye cup to a radiation detector to maintain a precisely repeatable position of the detecting element with respect to the eye. This apparatus is particularly useful in the diagnosis of ocular melanoma in patients who have ingested a radioactive chemical that is concentrated in an ocular melanoma. Such precisely repeatable positioning of the radiation detector allows use of smaller doses of the radioactive tracer, thus minimizing the radiation hazard to the patient.

6 Claims, 6 Drawing Figures

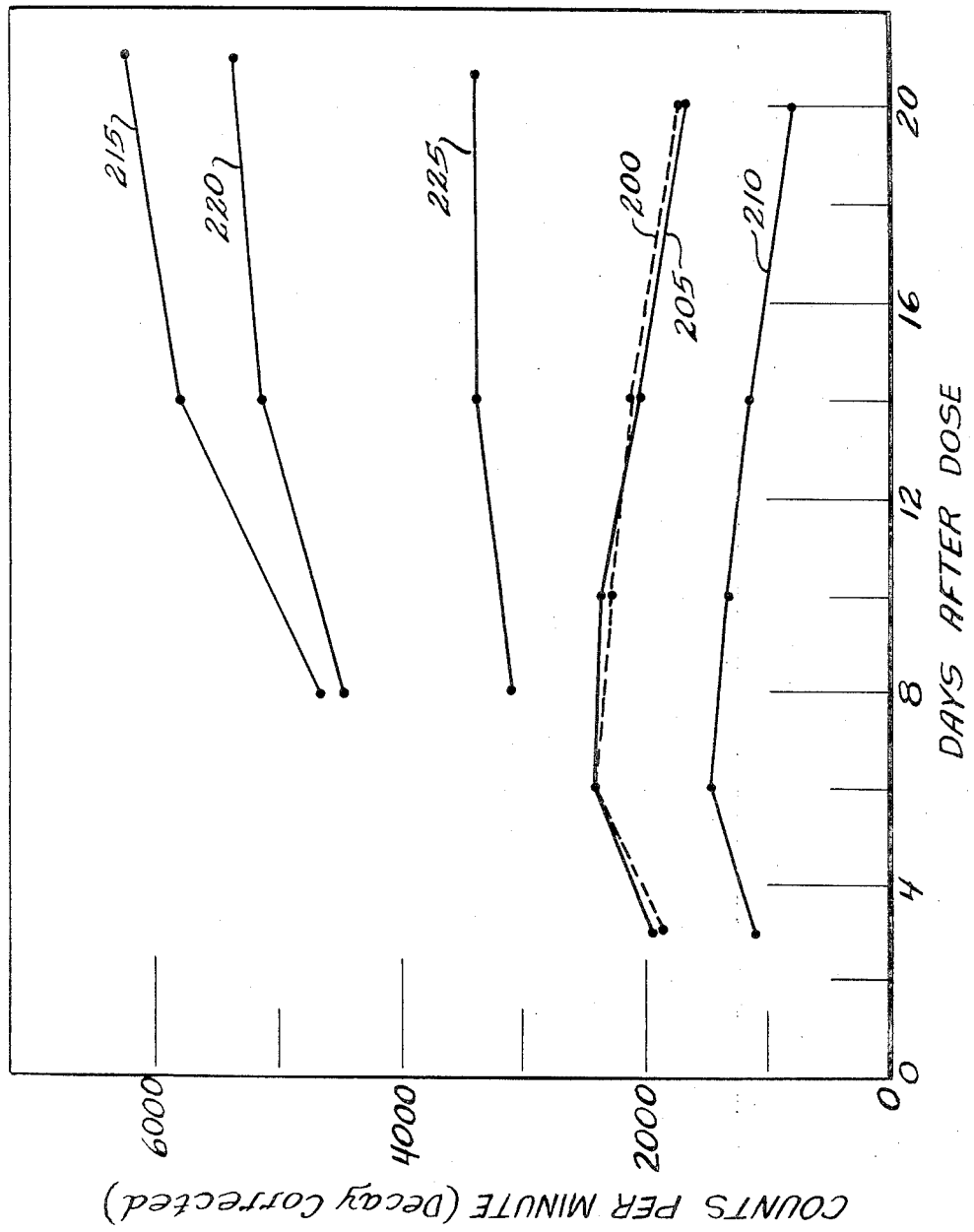
Fig—5

3,827,427

APPARATUS FOR MEASURING RADIOACTIVITY IN THE HUMAN EYE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention is an apparatus for measuring radioactivity in the human eye. It is of especial utility where an association exists or can be caused to exist between such radioactivity and an anomaly in the eye of a human patient.

The use of radioactive tracers for purposes of medical diagnosis is well known. This technique requires a chemical that is absorbed preferentially in the organ or by the anomaly under investigation and that can be tagged with an appropriate radioactive isotope. Conventional means of detecting radioactivity can then be used to obtain diagnostic information. It is necessary that the radioactive isotope be identifiable without ambiguity, and that the radioactivity produced by the isotope have a tolerable effect upon the patient. This effect is a function of both the half-life and the emission spectrum of the isotope. In general, it is desirable to use a tracer that emits low-energy particles or quanta and that has a half-life that is at most a few times the length of the experimental period. It is also desirable to minimize the quantity of radioactive isotope administered to the patient to reduce to the minimum his total exposure. One result of the foregoing is to hold the emission of radiation in a patient close to the background value. This fact places a premium upon the design of a detector that is capable of making repeatable eye-radioactivity measurements with high precision.

A confirmed diagnosis of ocular melanoma calls for immediate surgical enucleation of the affected eye. It has been observed that 19 percent of enucleated eyes with a clinical diagnosis of malignant melanoma do not contain such a tumor. Clearly, a method and means of increasing the percentage of cases in which malignant melanoma is diagnosed correctly would be of great benefit to patients subjected to such diagnosis. One attempt to effect such improvement has involved the administration of compounds containing $^{32}P$ to patients as a diagnostic aid. This compound produces beta rays as a product of disintegration. This fact produces the disadvantage of requiring surgery to place a detector sufficiently close to a suspected lesion at the rear of the eye to detect beta rays before they are absorbed in tissue.

The compound 4-(3-dimethylaminopropylamino)-7-iodoquinoline, henceforth referred to as iodoquinoline, is taken up preferentially by ocular melanomas. Substitution of radioactive $^{125}I$ makes the iodoquinoline a useful tracer compound to aid in the diagnosis of ocular melanomas. Radioactive decay of $^{125}I$ is characterized by a gamma ray having an energy of 35.5 KeV and a half-life of 59.7 days. This combination of energy and half-life provides a detectable signal in concentrations that can be tolerated by a patient. It is still desirable, of course, to minimize the exposure of the patient by administering a dose that is close to the minimum level of detection, or, in other words, close to the level of background radiation. This places a premium upon the development of an eye-radioactivity detector that provides a precisely reliable and repeatable result. The accomplishment of this objective is facilitated by using a device which provides repeatable positioning.

It is an object of the present invention to provide an improved apparatus for detecting radiation in the eye.

It is a further object of the present invention to provide an apparatus for measuring radiation in the eye reliably and repeatably.

It is a further object of the present invention to provide an apparatus for measuring radioactivity in the eye from a location outside the body.

It is a further object of the present invention to provide an apparatus for positioning a radiation detector precisely and repeatably near the human eye.

It is a further object of the present invention to provide for the repeated accurate detection of gamma rays emitted in the human eye by an apparatus that facilitates repeated relocation of a detector identically with respect to the eye.

It is a further object of the present invention to provide a means of detecting radiation from the eye of a human being who has ingested a quantity of 4-(3-dimethylaminopropylamino)-7-iodoquinoline in which the iodine is $^{125}I$.

It is a further object of the present invention to provide a means of detecting gamma rays emitted from the eye of a human being who has ingested a quantity of a radioactive tracer that is taken up preferentially by ocular melanoma, to assist in diagnosing ocular melanoma.

It is a further object of the present invention to provide a means for detecting radiation from the human eye, which means is relatively insensitive to radiation from other sources.

It is a further object of the present invention to provide a hand-held device that is precisely repeatable in position to detect radiation in the human eye.

Other objects will become apparent in the course of a detailed description of the invention.

SUMMARY OF THE INVENTION

A detector for detecting radiation in the human eye includes an attached eye cup shaped to fit the human eye and thereby permit precisely repeatable positioning of the detector with respect to the eye. Shielding against physical shock, external radiation and external magnetic fields reduces the sensitivity of the device to damage from shock and interference from background radiation and from stray magnetic fields. A calibrator enables an operator to monitor and maintain the measuring accuracy. This device is of especial use in assisting in the diagnosis of ocular melanoma in patients who have ingested 4-(3-dimethylaminopropylamino)-7-iodoquinoline in which the iodine is $^{125}I$.

BRIEF DESCRIPTION OF THE DRAWINGS

FIG. 5 is a first plot of data obtained using the apparatus of FIG. 1.

DETAILED DESCRIPTION OF THE PREFERRED EMBODIMENT

Figure 1:
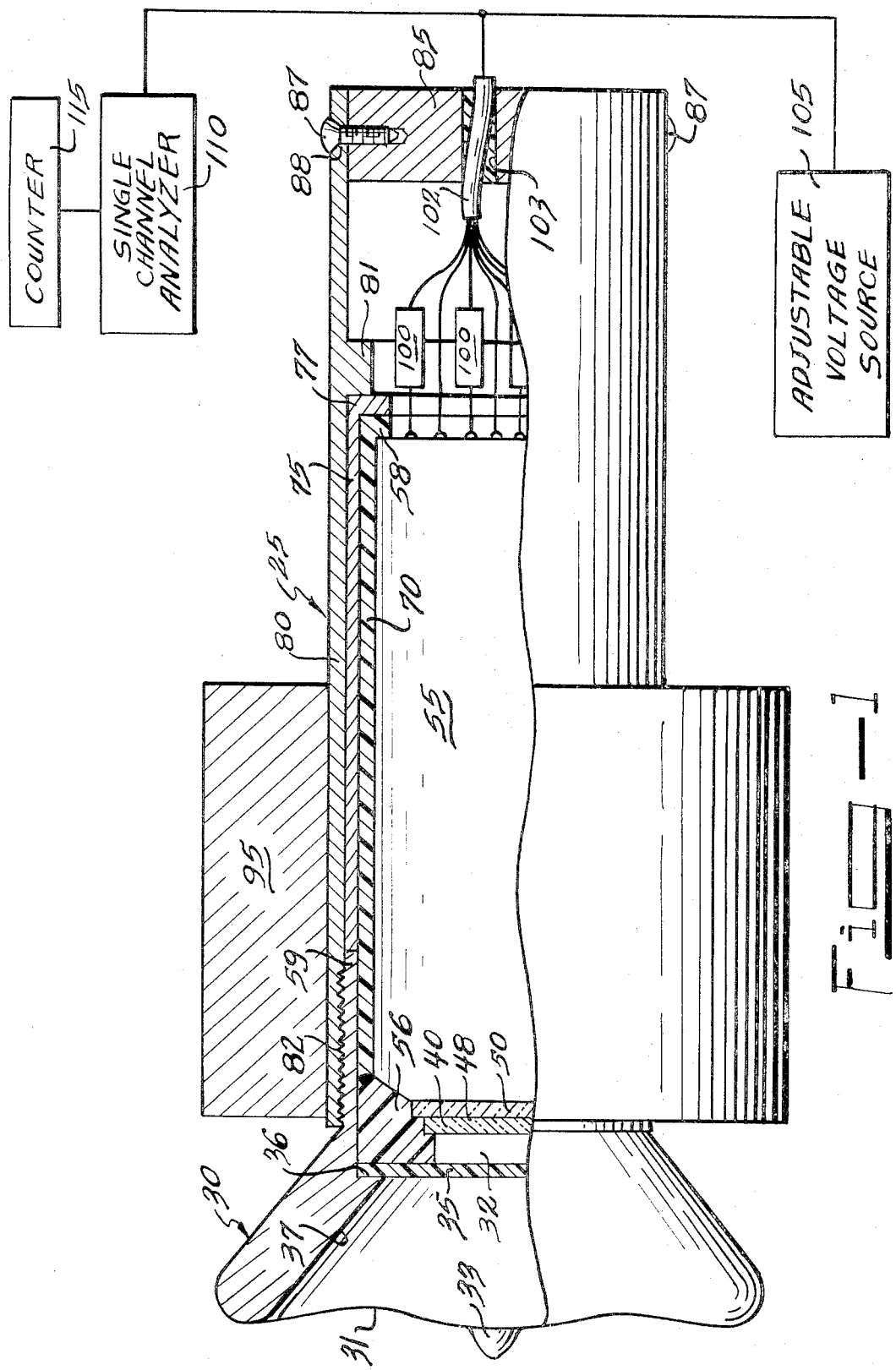
FIG. 1 is a partial sectional side view of an apparatus for the practice of the present invention.

FIG. 1 is a partial sectional side view of an apparatus for the practice of the present invention. In FIG. 1, a detector 25 is shown that is adapted for placement against the eye of a subject to measure radiation emanating therefrom. The detector 25 comprises an eye cup 30 which is formed of lead in the shape of a hollow truncated cone having an elliptical base. Large end 31 of eye cup 30 is sized and shaped to make touching engagement with the eye socket of a subject. With large end 31 in such touching engagement, radiation emanating from the eye of a subject passes through truncated end 32 of eye cup 30. A nib 33 is disposed at large end 31 of eye cup 30 with its axis parallel to the axis of eye cup 30. Nib 33 is shaped and sized for insertion into the canthus of the eye of the subject to facilitate repeatable positioning of detector 25.

End cap 35 is a disc that is disposed perpendicular to and symmetrically with respect to the axis of eye cup 30. End cap 35 engages eye cup 30 in slot 36, which is concentric with eye cup 30 and is located in inner wall 37 of eye cup 30. End cap 35 is made of a material that is opaque to light but substantially transparent to radiation, so as to permit unimpeded passage of such radiation to scintillator 40. Scintillator 40 is a crystal formed into a thin circular wafer that is disposed coaxially with and behind end cap 35. Optical grease 48 is disposed on the surface of scintillator 40 that faces away from end cap 35, maintaining scintillator 40 in optical and mechanical contact with pyrex end window 50 of photomultiplier tube 55. Scintillator 40 is also affixed to pyrex window 50 by sealing ring 56, which forms part of the support of end cap 35.

Photomultiplier tube 55 is preferably cylindrical in form and of the type having an end window. It is mounted coaxially with respect to eye cup 30 and is disposed to receive light emitted from scintillator 40 in response to radiation incident upon scintillator 40. Sealing ring 56 is a substantially toroidal structure that is disposed in contact with eye cup 30, end cap 35, scintillator 40, pyrex end window 50, and the end of photomultiplier tube 55 to prevent relative motion of these parts and maintain a rigid and unitary structure.

Shock absorber 70 is a cylindrical shell that is wrapped around photomultiplier tube 55 and extends along the cylindrical surface of photomultiplier tube 55 in an axial direction from a site of contact with sealing ring 56 to the other end of photomultiplier tube 55 where it forms a first lip 58. The end of shock absorber 70 that is closer to scintillator 40 is enclosed on the outside by the inside of cylindrical extension 59 of eye cup 30. Cylindrical extension 59 is in contact on its inside surface with sealing ring 56. The rest of shock absorber 70 is enclosed by magnetic shield 75, a thin sheet of a material having high magnetic permeability and low electrical loss that is wrapped into a cylinder in contact with and enclosing shock absorber 70. Axial motion of magnetic shield 75 with respect to shock absorber 70 is prevented by second lip 77. Stainless-steel cover 80 is a cylindrical enclosure that is coaxial with photomultiplier tube 55 and which extends along the axis of photomultiplier tube 55 from a point in contact with eye cup 30 in the plane of scintillator 40 past the opposite end of photomultiplier tube 55 for a distance of between two and three inches. Relative motion among the parts is prevented by third lip 81 which is a portion of cover 80 that forms a ring inside cover 80 and forms a stop for second lip 77. Rigidity is maintained by threads 82 between cover 80 and cylindrical extension 59 of eye cup 30. By these means a unitary assembly is formed that holds eye cup 30, end cap 35, scintillator 40, and photomultiplier tube 55 in fixed position in relation to each other.

The end of cover 80 away from eye cup 30 is closed by cap 85, a disc disposed coaxially with cover 80. Screws 87 pass radially through holes 88 in cover 80 and are threaded into cap 85.

Voltage-divider elements 100 are connected electrically to photomultiplier tube 55 and through cable 102 to adjustable voltage source 105 to supply operating voltages to photomultiplier tube 55. Cable 102 passes in an axial direction through hole 103 in cap 85, and is also connected electrically to single-channel analyzer 110 to carry electrical signals generated by photomultiplier tube 55 in response to radiation incident upon scintillator 40. Single-channel analyzer 110 is connected electrically to counter 115 to obtain a count of the signals passed by single-channel analyzer 110.

Figure 2:
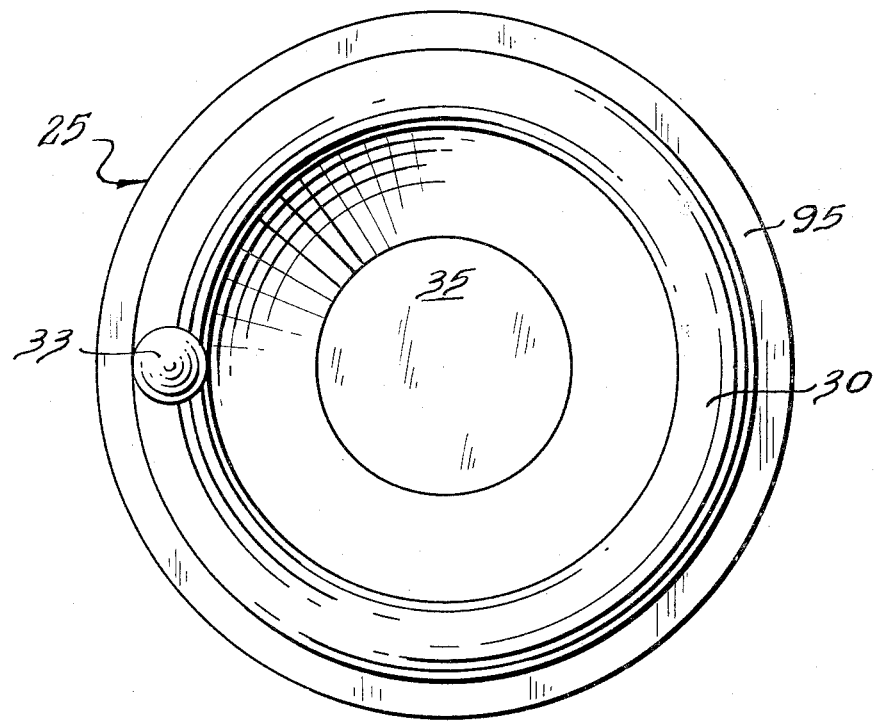
FIG. 2 is an end view of the detector of FIG. 1.

Operation of detector 25 can be further appreciated by referring to FIG. 2, which is a view of detector 25 as seen along its axis from the end facing eye cup 30. Nib 33 projects from eye cup 30 toward the viewer, and end cap 35 is visible in the center of eye cup 30. Radiation shield 95 projects outside eye cup 30. In the preferred embodiment of this invention, eye cup 30 is made of lead for radiation shielding. Since radiation shield 95 is also made of lead, end cap 35, a disc of plastic, is a cover over the only opening into detector 25 in the view of FIG. 2 that is not opaque to radiation.

Figure 3:
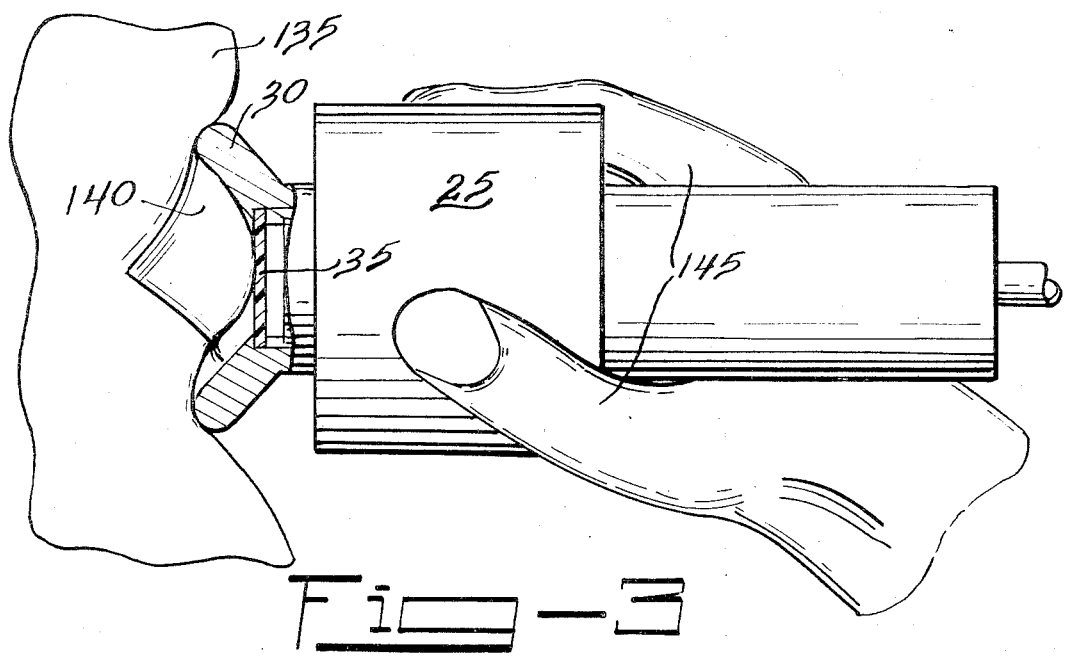
FIG. 3 is a view of the detector of FIG. 1 in measuring position at a human eye.

FIG. 3 is a sketch showing the detector 25 of FIG. 1 in position to measure radiation from a human eye. A partial section illustrates the placing of eye cup 30 against the head 135 of the patient. Eye cup 30 engages the eye socket. End cap 35 is touching the closed eye 140, and detector 25 is held in position for a desired time by the hand 145 of an operator. It is useful in making radiation measurements of the eye for diagnostic purposes to obtain comparisons among radiation levels observed at each eye and at a background radiation level. This has been achieved by placing the detector 25 against one eye for 1 minute and recording the radiation count, then repeating for 1 minute with the other eye, than placing the detector against the forehead of the patient for 1 minute to obtain a background count. This cycle is repeated several times and the counts are averaged to give a reading each for the left eye, right eye, and background. Repeatability of measurement position is increased by inserting nib 37 in the canthus of the eye to insure repeatable positioning of detector 25.

Figure 4:
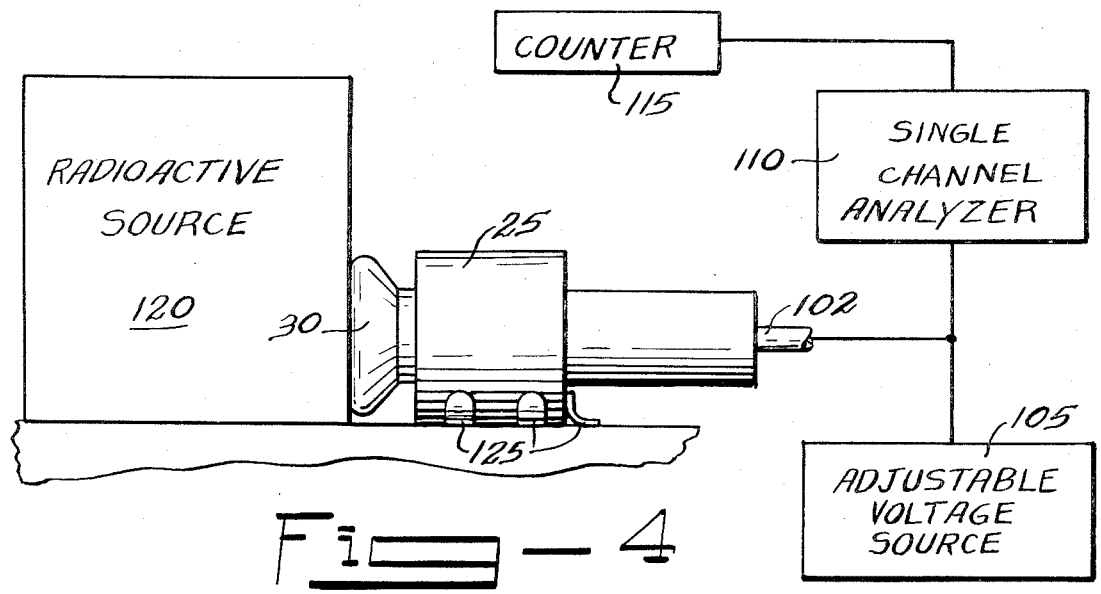
FIG. 4 is a side view showing the apparatus of FIG. 1 in position in a calibration stand.

FIG. 4 shows the apparatus of FIG. 1 in position in a calibration station. Radioactive source 120 comprises a quantity of radioactive material producing a known amount of radiation in a known range of energies. Brackets 125 cooperate to maintain detector 25 in a fixed and repeatable position with respect to radioactive source 120. Eye cup 30 is placed in closest proximity to radioactive source 120 to direct radiation from radioactive source 120 into detector 25 through eye cup 30. Signals generated in detector 25 in response to radiation from radioactive source 120 are transmitted through cable 102 to single-channel analyzer 110 and signals selected by single-channel analyzer 110 are transmitted to counter 115. Calibration of detector 25 to respond repeatably to radiation from radioactive source 120 may be effected by adjusting adjustable voltage source 105 to change the voltage supplied to the photomultiplier tube in detector 25. Calibration may also be effected by adjusting the single-channel analyzer 110, or by adjusting both single-channel analyzer 110 and adjustable voltage source 105.

The apparatus of the present invention is useful for detecting radiation in the eye resulting from any cause, and it is particularly useful for assisting in the diagnosis of ocular melanoma in a patient who has previously ingested 4-(3-dimethylaminopropylamino)-7-iodoquinoline containing radioactive $^{125}$I. To use this apparatus, the detector is placed at the measuring site. For measuring radiation from the eye, the measuring site is placement over the eye. For measuring background, a neutral site such as the forehead is useful and has been used. For calibrating, the measuring site is the structure of FIG. 5. Whatever the source, the radiation when incident upon a scintillator produces a scintillation. Optical coupling to a photomultiplier results in the generation of an electrical pulse which is fed to a single-channel analyzer. A window is selected in the single-channel analyzer to pass only pulses in an energy range characteristic of the radiation being monitored. For example, if $^{125}$I is the source, the single-channel analyzer is set to provide a window representing gamma-ray energies in a narrow range about 35 KeV. Selected pulses are counted during a desired time interval, and the count of pulses is displayed for analysis.

Accuracy of measurement is greatest when stray radiation is excluded from or minimized at the scintillator 40 and when the scintillator 40 is placed repeatably in the same position with respect to the eye. Radiation shield 95 is made of lead to reduce the amount of stray radiation incident upon scintillator 40 from any direction except through the opening of eye cup 30 and through end cap 35. Further shielding is afforded by making eye cup 30 of lead. Repeatability of positioning is enhanced by inserting nib 37 into the canthus of the eye undergoing measurement.

The results of making a series of measurements using the method and apparatus of the present invention are shown in FIG. 5, which is a plot of corrected count rate vs. number of days after administration of a dose of radioactive iodoquinoline. The count rate is corrected for decay by multiplying the observed count by the factor exp $(t \ln 2/T)$, where $t$ is the time in days since ingestion of the radioactive dose, $T$ is the half-life in days of the radioisotope, and $\ln 2$ is the natural logarithm of the number 2. Curves 200, 205, and 210 connect points representing corrected counts obtained from a patient who did not have ocular melanoma. Curve 200 represents points obtained on the right eye, curve 205, the left eye, and curve 210, the forehead, of this patient. Curves 200 and 205 are very close together, indicating essentially no difference in the counts obtained from the two eyes. Curves 215, 220, and 225, on the other hand, connect points representing counts obtained from a patient found by other diagnostic means to have melanoma of the left eye. Curve 215 represents the count obtained from the left eye of this patient; curve 220, the right eye; and curve 225, the forehead. Curve 215 is above curve 220, showing an increased uptake of the radioactive isotope in the diseased eye as compared to the other eye. These curves are reproduced as obtained from observations on two patients. The principal assistance to diagnosis lies in the comparison from eye to eye. Differences in dosages, sizes of patients, metabolic rates, and other factors may produce differences in levels such as those evident here between curves 200, 205, and 210 on the one hand and curves 215, 220, and 225 on the other.

Figure 6:
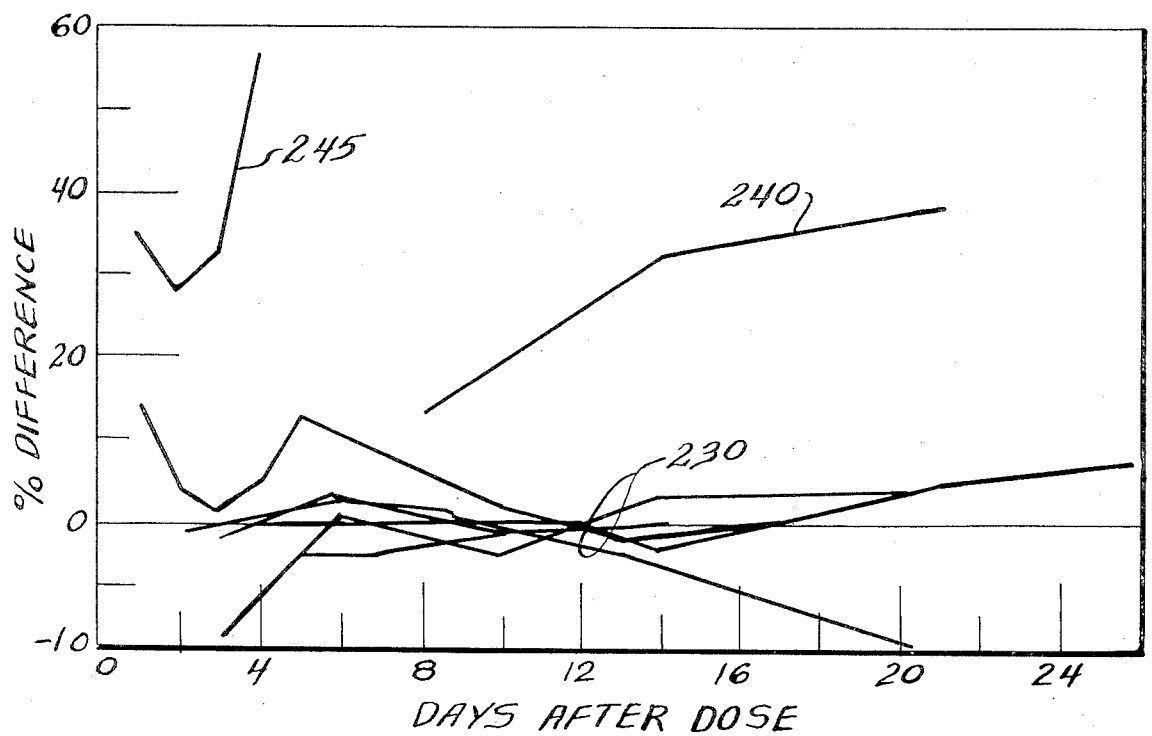
FIG. 6 is a second plot of data obtained using the apparatus of FIG. 1.

FIG. 6 is a plot of the per cent difference vs. the number of days following administration of a radioactive isotope. Seven patients are represented in the data of FIG. 6. The per cent difference is a number obtained for each day of measurement on each patient by the following process: (1) average the right-eye counting rate; (2) average the left-eye counting rate; (3) average the forehead counting rate; (4) correct all averaged counting rates for decay as indicated above; (5) call the eye suspected of abnormality the first eye; if neither is suspected, call the left eye the first eye; (6) obtain a first-eye net corrected counting rate A by subtracting the corrected averaged forehead counting rate from the corrected averaged counting rate for the first eye; (7) obtain a second-eye net corrected counting rate B by subtracting the corrected averaged forehead counting rate from the corrected averaged counting rate for the second eye; (8) calculate the per cent difference R according to the formula $$R = 2(A - B)/A + B \times 100.$$

In FIG. 6, the group of five curves 230 comprises the values of R obtained upon five patients who did not have ocular melanomas. Curves 240 and 245 represent values of $R$ obtained upon two patients who had ocular melanoma. A large and increasing value of $R$ is thus associated with ocular melanoma, with the affected eye producing the higher reading. A value of $R$ that remains less than 20 per cent indicates the absence of ocular melanoma. The difference between a curve obtained from a normal patient and one who has an ocular melanoma is seen to be pronounced, making such a curve an effective aid in the diagnosis of ocular melanoma.

The results presented herein were obtained upon patients who had ingested oral doses of iodoquinoline containing radioactive $^{125}$I. The apparatus used an RCA 4460 photomultiplier tube and a crystal of sodium iodide comprising a round wafer having a diameter of 1/2 inch and a thickness of 1.0 mm. This thickness was chosen to assure nearly 100 percent intrinsic efficiency for detecting the gamma rays emitted by $^{125}$I. Another embodiment of the invention has been constructed using a bialkali tube, an RCA C70136H. The basis of choice for the tube is a spectral response (here, S-11) appropriate to the tracer to be detected and a diameter (here, 1/2 inch) allowing construction of an apparatus that is easily held in the hand.

Other considerations might warrant changes within the scope of the present invention. For example, the preferential uptake of iodoquinoline associated with the metabolic activity characteristic of malignant melanomas makes this compound a preferred means of administering a radioactive tracer. Other ocular anomalies might make it desirable to use other compounds or other radioactive tracers.

Persons skilled in the art will, of course, readily adapt the teachings of the present invention to embodiments and methods differing from those described and illustrated above. Therefore, the present invention should be limited only in accordance with the appended claims.

The embodiments of the invention in which an exclusive property or privilege is claimed are defined as follows:

1. A device for measuring gamma radiation emitted from an eye comprising:
   a. a photomultiplier tube having an end window;
   b. a scintillator responsive to gamma radiation in optical and mechanical contact with the end window of the photomultiplier tube;
   c. a counter connected electrically to the photomultiplier tube and responsive to the electrical signals produced by the photomultiplier tube to provide a measure of the gamma radiation incident upon the scintillator; and
   d. an eye cup having a large end adapted to contact the eye socket of a subject and a small end sealed to said photomultiplier tube with the scintillator and end window sealed within the small end of the eye cup.

2. A device according to claim 1 and including a nib on the periphery of the eye cup projecting outwardly from the eye cup adapted for placement in the canthus of the human eye.

3. A device according to claim 2 wherein said eye cup is formed of a gamma radiation shielding material.

4. A device according to claim 3 and including a gamma radiation shield disposed circumferentially about the photomultiplier tube adjacent said scintillator whereby only gamma radiation emitted from the eye is incident upon the scintillator.

5. A device according to claim 2 and including an end cap formed of a material that is opaque to light but substantially transparent to gamma radiation sealed within said eye cup perpendicular to and symmetrically with respect to the axis of the eye cup and adapted to engage the closed eye of the subject.

6. A hand-held detector of gamma radiation from the human eye comprising: a scintillating crystal responsive to gamma radiation and generating optical scintillations therefrom; an end-window photomultiplier tube connected physically and optically to said scintillating crystal and responsive to said optical scintillations therefrom; an open-ended eye cup made of a material substantially opaque to gamma radiation, said eye cup having at its outer periphery a projecting nib adapted for placement in the canthus of a human eye, said eye cup further having an axial passage therethrough that is coupled radiatively to said scintillating crystal; an end cap of a material substantially transparent to gamma radiation and opaque to visible radiation, said end cap connected to said eye cup and disposed in said axial passage to block light entering said passage through said eye cup; a shock absorber disposed circumferentially about said photomultiplier and connected circumferentially thereto; a metal cover disposed circumferentially about said shock absorber and connected to said shock absorber and said eye cup to form with said eye cup a unitary structure about said photomultiplier; a radiation shield disposed circumferentially about a portion of said outer metal cover near said scintillating crystal and coupled to said eye cup to provide therewith a shield against gamma radiation incident upon said scintillating crystal except through said passage through said eye cup; an electrode voltage supply coupled electrically to said photomultiplier to provide electrical operating voltages thereto; and a counter connected electrically to said photomultiplier to receive therefrom electrical signals corresponding to light signals detected by said photomultiplier and to obtain a count thereof.

* * * * *